United States Patent [19]
Koonen

[11] Patent Number: 5,751,456
[45] Date of Patent: May 12, 1998

[54] MULTIWAVELENGTH ADD/DROP MULTIPLEXER

[75] Inventor: Antonius Marcellus Jozef Koonen, Eemnes, Netherlands

[73] Assignee: Lucent Technologies Inc., Murray Hill, N.J.

[21] Appl. No.: 604,136

[22] Filed: Feb. 20, 1996

[51] Int. Cl.$^6$ .................................................. H04J 14/02
[52] U.S. Cl. ........................... 359/127; 359/124; 385/24
[58] Field of Search .................................. 359/126, 127, 359/158, 161, 173, 124–125; 385/24

[56] References Cited

U.S. PATENT DOCUMENTS

| | | | |
|---|---|---|---|
| 5,231,529 | 7/1993 | Kaede | 359/124 |
| 5,596,448 | 1/1997 | Onaka et al. | 359/161 |

*Primary Examiner*—Kinfe-Michael Negash
*Attorney, Agent, or Firm*—Lester H. Birnbaum; Christopher N. Malvone

[57] ABSTRACT

The invention relates to a multiwavelength add/drop multiplexer for use in an optical fiber communication system having a main optical fiber. The multiplexer includes an optical element, in the form of an optical circulator, arranged to direct substantially all of the light transmitted in a predetermined direction along the main optical fiber into a branch optical fiber regardless of wavelength. The branch optical fiber includes a transmission filter, in the form of a Fabry-Perot filter, arranged to transmit light of a predetermined wavelength and reflect the non-transmitted light back towards said main optical fiber for continued propagation along said main optical fiber. The multiplexer also includes a receiver for receiving the transmitted light, and further includes a transmitter arranged to transmit optical data signals along said branch optical fiber, through said transmission filter and towards said optical element, for propagation along said main optical fiber.

7 Claims, 2 Drawing Sheets

MULTIWAVELENGTH ADD/DROP MULTIPLEXER

TECHNICAL FIELD

The present invention relates to a multiwavelength multiplexer for use in an optical fiber communication system.

BACKGROUND OF THE INVENTION

The data carrying capacity of an optical fiber communication system can be increased by transmitting optical data signals along an optical fiber in the communication system at a plurality of different wavelengths.

Light at predetermined wavelengths is coupled into and removed from an optical fiber in such a communication system through an optical element known as a multiwavelength add/drop multiplexer. It is imperative that the wavelength of optical data signals added to a communication system through a particular multiplexer are synchronized to the wavelength of the optical data signals dropped from the system at said multiplexer, in order to minimize the possibility of interference between the added optical data signals and optical data signals, at other wavelengths, utilized by the communication system.

One commonly used type of multiwavelength add/drop multiplexer operates by first selecting the wavelength of a signal to be dropped from the light propagating along an optical fiber and then diverting light of that wavelength only into a first branch optical fiber for receipt by a receiver. This is achieved by: propagating all of the light along a main fiber; splitting the light into its different wavelengths, using a wavelength division de-multiplexer, propagating light at each wavelength into a different optical fiber, selecting light of the desired wavelength, using an optical switching element; coupling light at the desired wavelength into a branch optical fiber, and coupling the remaining light back into the main optical fiber. The optical elements involved in this process cause an overall loss of light resulting in a decrease in the signal to noise ratio of the signals transmitted, at all wavelengths, along the main optical fiber.

Light may be added to the optical communication system using this type of multiplexer, through a second branch optical fiber connected between a transmitter, which produces the signals to be added, and an optical coupler utilized to couple the light into the main optical fiber.

The light loss problems discussed above are addressed by another known add/drop multiplexer, as illustrated in FIG. 1, which is a schematic view of such a multiplexer.

This multiplexer is disclosed in "An Optical FDM-Add/Drop Multiplexing Ring Utilizing Fibre Fabry-Perot Filters and Optical Circulators", by Kazuhiro Oda and Hiromu Toba, IEEE PHOTONICS LETTERS, VOL 5, NO 7, JULY 1993.

The multiplexer 2 comprises a three port optical circulator 4, the first and third ports 41,43 of which are connected to a main optical fiber 6 and the second port 42 of which is connected to a branch optical fiber 8. The optical circulator 4 is arranged to direct substantially all of the light transmitted in a predetermined direction along the main optical fiber 6 into the branch optical fiber 8, regardless of wavelength ($\lambda_1$–$\lambda_4$). The branch optical fiber 8 incorporates a transmission filter in the form of a known Fabry-Perot filter 10, which transmits light of a predetermined wavelength ($\lambda_1$) and reflects the non-transmitted light ($\lambda_2$–$\lambda_4$) back towards the optical circulator 4 for continued propagation along the main optical fiber 6 in the aforementioned predetermined direction.

The three port optical circulator 4 is arranged to receive light through a first port 41 and direct the received light to a second port 42, where it is transmitted out of the optical circulator 4 and along the branch optical fiber 8 connected thereto. Light transmitted back along the branch optical fiber 8 towards the second port 42 of the optical circulator 4 is received by the optical circulator 4 and directed towards the third port 43 of the optical circulator 4, where it is transmitted along a continuation of the main optical fiber 6 connected thereto.

Thus the light reflected by the Fabry-Perot filter 10 is re-injected into the main optical fiber 6 for continued transmission after passing through only one optical element. Light transmitted by the Fabry-Perot filter 10 is received by an optical receiver 12, optically connected to the branch optical fiber 8, for conversion into an electronic signal.

Optical data signals to be added to the main optical fiber 6 are produced by an optical transmitter 14, optically connected to the main optical fiber 6 through a second branch optical fiber 16, which is coupled to the main optical fiber 6 by a fiber directional coupler 17. The wavelength ($\lambda_1'$) of the optical data signals produced by the transmitter is substantially the same as that ($\lambda_1$) of the optical data signals received by the receiver.

However, there is a considerable problem with these multiwavelength add/drop multiplexers due to interference between the light added to the main optical fiber through the multiplexers and the light propagating along the main fiber. The interference is caused by drifting of the wavelength of the added light away from the predetermined wavelength ($\lambda_1$) towards the wavelengths ($\lambda_2$–$\lambda_4$) of the remainder of the light in the main optical fiber.

It is an object of the present invention to provide a multiwavelength add/drop multiplexer which addresses the problems discussed above.

SUMMARY OF THE INVENTION

According to the present invention there is provided a multiwavelength add/drop multiplexer for use in an optical fiber communication system having a main optical fiber, an optical element arranged to direct substantially all of the light transmitted in a predetermined direction along said main optical fiber into a branch optical fiber regardless of wavelength, the branch optical fiber including a transmission filter arranged to transmit light of a predetermined wavelength and reflect the non-transmitted light back into said main optical fiber for continued propagation along said main optical fiber. The transmitter further includes a receiver for receiving the transmitted light, and a transmitter arranged to transmit optical data signals along said branch optical fiber, through said transmission filter towards said optical element, for propagation along said main optical fiber.

It is an advantage of the present invention that light at a predetermined wavelength can be injected into or removed from an optical fiber while having a minimal effect on light at other wavelengths which is also being propagated along the optical fiber, due to the wavelength synchronization of the extracted and the injected light, which is achieved through the use of the same transmission filter during extraction and injection.

BRIEF DESCRIPTION OF THE DRAWING

An embodiment of the present invention will now be described, by way of example, with reference to the accompanying drawings in which.

DETAILED DESCRIPTION

Figure 2:
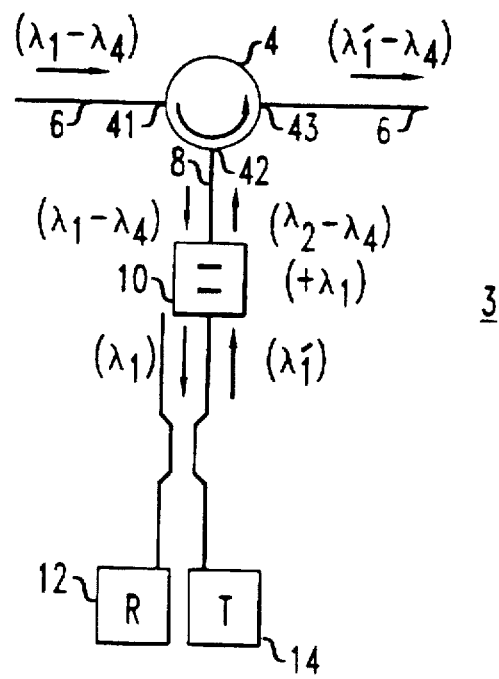
FIG. 2 illustrates a schematic view of a multiwavelength add/drop multiplexer in accordance with the present invention.

With reference to FIG. 2 there is illustrated a multiwavelength add/drop multiplexer 3 in accordance with the present invention, for use with a fiber optic communication system incorporating a main optical fiber 6. The multiplexer 3 incorporates an optical element, in the form of a three port optical circulator 4 such as the CR 1500 Series Optical Circulator manufactured by JDS FITEL Inc.

Figure 1:
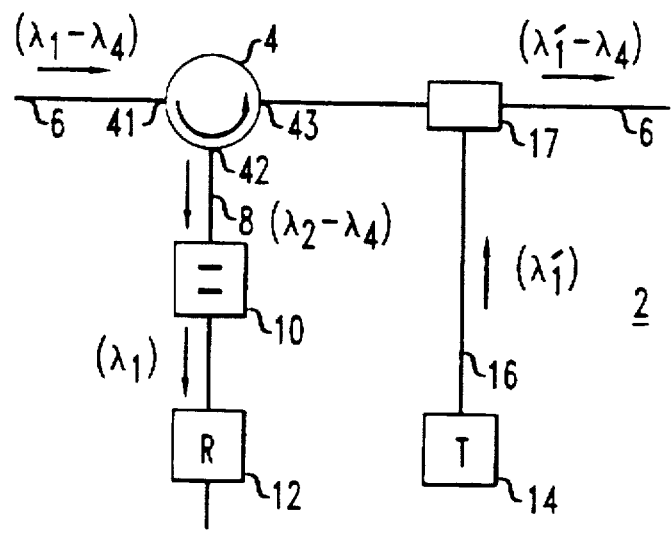
FIG. 1 illustrates a multiwavelength add/drop multiplexer in accordance with the prior art.

The multiplexer 3 operates in order to drop light of a predetermined wavelength ($\lambda_1$), in the same way as the known multiplexer depicted in FIG. 1.

However, the multiplexer 3 does not include a second branch optical fiber, the transmitter 14 being connected to the single branch optical fiber 8. Thus when optical data signals are to be added to the main optical fiber 6 utilizing the multiplexer 3 the data signal is transmitted along the single branch optical fiber 8, through the Fabry-Perot filter 10 and directed through the optical circulator 4 for propagation along the continuation of the main optical fiber 6 connected thereto.

The Fabry-Perot filter 10 has a narrow pass band, of the order of 1–2 nanometers. If the optical data signals produced by the transmitter 14 are not maintained at the same wavelength ($\lambda_1$) as the dropped optical data signals, or at least at a wavelength within the pass band of the Fabry-Perot filter 10, the optical data signal will not be passed by the filter 10.

If a wavelength tunable filter such as wavelength tunable Fabry-Perot filter is utilized the wavelength of the light transmitted by the filter can be selectively altered.

Figure 3:
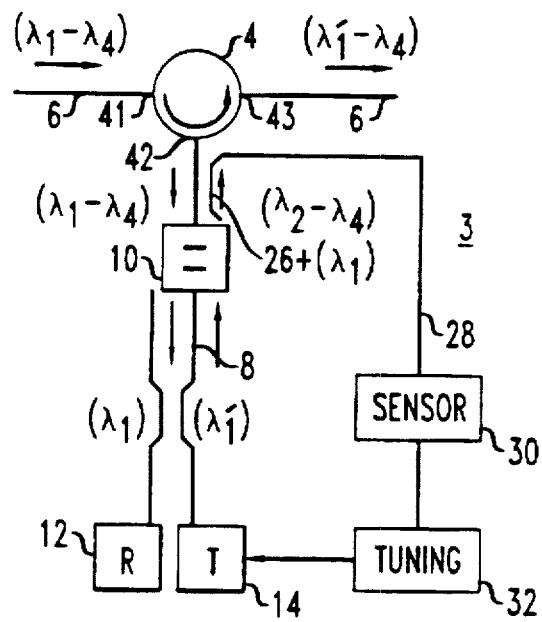
FIG. 3 illustrates a schematic view of the multiplexer of FIG. 2 adapted to optimize wavelength synchronization within the multiplexer.

With reference to FIG. 3 there is illustrated a multiwavelength add/drop multiplexer 3, in accordance with the present invention, which has been adapted to enable enhanced synchronization of the wavelength ($\lambda_1'$) of the light to be added to that ($\lambda_1$) of the light which has been dropped.

The adaptation involves tapping off a small percentage of the light emitted from the transmitter 14 and passed by the Fabry-Perot filter 10, using a coupling 26 located between the filter 10 and the circulator 4. The light from the coupler 26 is propagated along an optical fiber 28 into an optical sensor 30. The injected light ($\lambda_1'$) can be discerned from the other wavelengths ($\lambda_2$–$\lambda_4$) in the optical fiber 28, by an electrical pilot signal added to the data signal in the transmitter 14, generally by a tuning means 32. The transmission wavelength of the transmitter is thereafter tuned, by the tuning means 32 in a feedback loop, to maintain the signal from the optical detector 30 at a maximum, thus maintaining the transmission wavelength ($\lambda_1'$) of the transmitter at the pass wavelength ($\lambda_1$) of the filter 10.

Figure 4:
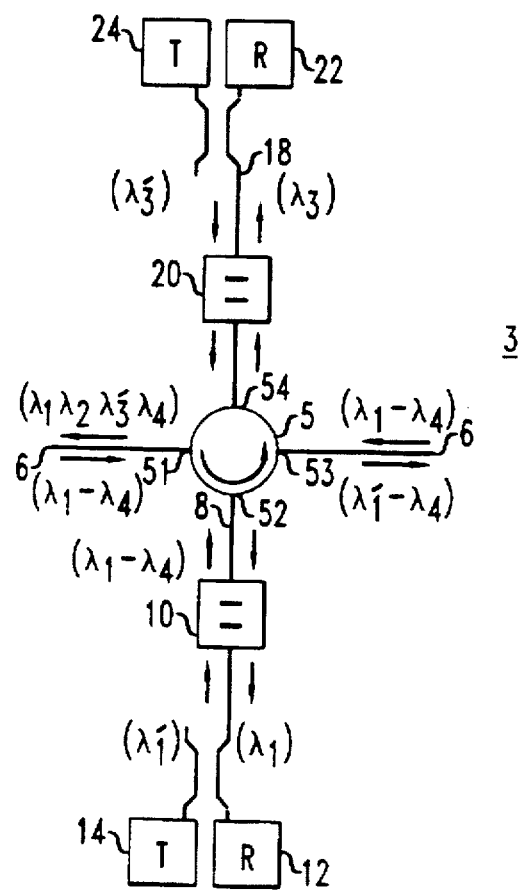
FIG. 4 illustrates the multiplexer of FIG. 2 adapted to enable bi-directional optical communications.

With reference to FIG. 4, there is illustrated a multiwavelength add/drop multiplexer 3, in accordance with the present invention, which has been adapted for bi-directional communication along the main optical fiber 6. In the multiplexer 3 of FIG. 4 the three port optical circulator 4 of FIG. 2 has been replaced by a four port optical circulator 5. Optical communications in the predetermined direction referred to in FIG. 2 is carried out as described above with reference to FIG. 2.

Light transmitted in the direction opposite to the aforementioned predetermined direction enters the optical circulator 5 through the third port 53 and is directed by the optical circulator 5 to a fourth port 54 where it is transmitted along a second branch optical fiber 18 connected thereto. The second branch optical fiber 18 also contains an optical filter in the form of a Fabry-Perot filter 20, which transmits light at a predetermined wavelength ($\lambda_3$). The second branch optical fiber 18 is coupled to an optical receiver 22 and an optical transmitter 24 which operate in order to receive optical data signals at said predetermined wavelength ($\lambda_3$) and transmit optical data signals at a wavelength ($\lambda_3'$) substantially equal to said predetermined wavelength ($\lambda_3$), as described above with reference to the corresponding optical receiver 12 and transmitter 14 in FIG. 2.

Light at a wavelength ($\lambda_3'$) transmitted by the Fabry-Perot filter 20 towards the optical circulator 5 and the light reflected from the Fabry-Perot filter 20 towards the optical circulator 5 is received by the fourth port 54 of the optical circulator 5 and directed towards the first port 51 of the optical circulator 5 for propagation along the main optical fiber 6 connected thereto, in the direction opposite to the aforementioned predetermined direction.

The invention claimed is:

1. A multiwavelength add/drop multiplexer for use in an optical fiber communication system comprising;

a main optical fiber, a branch optical fiber;

an optical element arranged to direct substantially all of the light transmitted in a predetermined direction along said main optical fiber into said branch optical fiber, regardless of wavelength;

a transmission filter coupled to said branch optical fiber and arranged to transmit light of a predetermined wavelength and reflect the non-transmitted light back towards said main optical fiber for continued propagation along said main optical fiber;

a receiver for receiving the transmitted light; and and a transmitter arranged to transmit optical data signals along said branch optical fiber, through said transmission filter and towards said optical element for propagation along said main optical fiber.

2. A multiplexer according to claim 1, further comprising control means arranged to optimize the synchronization of the transmission wavelength of said transmitter to the wavelength of the optical data signal dropped by the multiplexer.

3. A multiplexer according to claim 1, wherein said transmission filter is wavelength tunable.

4. A multiplexer according to claim 1, wherein said transmission filter is a Fabry-Perot filter.

5. A multiplexer according to claim 1, wherein said optical element is formed by an optical circulator.

6. A multiplexer according to claim 5, wherein said optical circulator is a three port optical circulator arranged to allow light transmitted along said main optical fiber in said predetermined direction and diverted into said branch optical fiber to be re-injected into said main optical fiber for continued propagation in said predetermined direction.

7. A multiplexer according to claim 5, wherein said optical circulator is a four port optical circulator arranged to allow propagation of light in both said predetermined direction and the direction opposite to said predetermined direction and the diversion both of light propagating in said predetermined direction into said branch optical fiber and of light propagating in said opposite direction into a second branch optical fiber.

* * * * *